United States Patent
Codella et al.

(10) Patent No.: US 10,664,894 B2
(45) Date of Patent: May 26, 2020

(54) DETERMINATION OF UNIQUE ITEMS BASED ON GENERATING DESCRIPTIVE VECTORS OF USERS

(71) Applicant: International Business Machines Corporation, Armonk, NY (US)

(72) Inventors: Noel C. Codella, White Plains, NY (US); Hui Wu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 15/610,797

(22) Filed: Jun. 1, 2017

(65) Prior Publication Data

US 2018/0349977 A1    Dec. 6, 2018

(51) Int. Cl.
| | |
|---|---|
| *G06Q 30/00* | (2012.01) |
| *G06Q 30/06* | (2012.01) |
| *G06Q 50/00* | (2012.01) |
| *G06N 20/00* | (2019.01) |
| *G06N 5/02* | (2006.01) |
| *G06N 3/08* | (2006.01) |

(52) U.S. Cl.
CPC ........... *G06Q 30/0631* (2013.01); *G06N 3/08* (2013.01); *G06N 5/022* (2013.01); *G06N 20/00* (2019.01); *G06Q 30/0643* (2013.01); *G06Q 50/01* (2013.01)

(58) Field of Classification Search
CPC .................................................. G06Q 30/0631
See application file for complete search history.

(56) References Cited

U.S. PATENT DOCUMENTS

2015/0073931 A1* 3/2015 Ronen ................ G06Q 30/0631
                                                                  705/26.7
2019/0205965 A1* 7/2019 Li ........................... G06F 16/27

OTHER PUBLICATIONS st.com, inc.; patent issued for systems, methods, and devices for measuring similarity of and generating recommendations for unique items (U.S. Pat. No. 9,324,104). (May 11, 2016). Computer Weekly News Retrieved from https://search.proquest.com/docview/1786880510?accountid=14753.*

Zhao, Q., "E-commerce Product Recommendation by Personalized Promotion and Total Surplus Maximization", Feb. 22-25, 2016, p. 709.

(Continued)

*Primary Examiner* — Kathleen Palavecino
(74) *Attorney, Agent, or Firm* — Scully, Scott, Murphy & Presser, P.C.; JoAnn Kealy Crockett

(57) ABSTRACT

Product recommendations are provided to a target user that take into account the style, interests, and hobbies of the target user and a desire by the target user to be unique from the target user's social group. In some aspects, a list of recommended products may be generated for the target user based on data about the target user's purchasing habits, social media interactions, or any other data. A list of products associated with users in the target user's social group may also be generated, for example, based on products purchased, currently worn by, or previously worn by the users in the target user's social group. A uniqueness-aware list of recommended products may then be generated from the list of recommended products by removing any products found in both the list of recommended products and the list of products associated with users in the target user's social group.

20 Claims, 4 Drawing Sheets

(56) References Cited

OTHER PUBLICATIONS

Zhang, S. et al, "Tracking Persons-of-Interest via Adaptive Discriminative Features", 2016, pp. 1-16.
Park, Y.J. et al., "Individual and group behavior-based customer profile model for personalized product recommendation", 2007, pp. 1932-1939.
Esparza, S. et al., "Mining the real-time web: A novel approach to product recommendation", Sep. 28, 2011, pp. 3-11.
Chen, L., Recommender systems based on user reviews: the state of the art, Jan. 22, 2015, pp. 99-154.
Zhao, W. X. et al., "Explolring demographic information in social media for product recommendation", Oct. 23, 2015, pp. 61-89.
Ricci, F. et al, "Product Recommendation with Interactive Query Management and Twofold Similarity", ICCBR 2003, LNAI 2689, pp. 479-493.

\* cited by examiner

DETERMINATION OF UNIQUE ITEMS BASED ON GENERATING DESCRIPTIVE VECTORS OF USERS

BACKGROUND

The present disclosure relates to improvements in the systems and methods used to recommend products to users.

Product recommendation systems may determine which products to suggest to a target user in a variety of different ways. In some aspects, for example, product suggestions may be based on the target user's prior purchasing activity on-line, in store, and in any other manner. Product suggestions may also be based on a target user's searching activity, for example, the target user's use of a search engine, mobile application, or other similar tools.

BRIEF SUMMARY

In an aspect of the present disclosure, a method for product recommendation emphasizing uniqueness is disclosed including receiving data associated with a target user, generating a descriptive vector for the target user based on the received data, executing a machine learned recommendation function with the descriptive vector to generate a score for each of a plurality of pre-defined fashion attributes, comparing the descriptive vector of the target user to a descriptive vector of at least one other user determining, based on the comparison, that a similarity between the descriptive vector of the target user and the descriptive vector of the at least one other user is above a pre-determined threshold, in response to determining that the similarity is above the pre-determined threshold, generating a list of products that are associated with the at least one other user, determining for each product in the list of products, at least one of the pre-defined fashion attributes as a fashion attribute of the product, generating a list of recommended products for the target user from the list of products based on the generated score of each of the pre-defined fashion attributes that are determined to be fashion attributes of the products in the list of products, determining, based on the data associated with the target user, users that are in the target user's social group, determining a list of products that are associated with the users in the target user's social group, comparing the list of recommended products for the target user to the list of products that are associated with the users in the target user's social group, determining, based on the comparison, that at least one product is included in both the list of recommended products for the target user and the list of products that are associated with the users in the target user's social group, removing the at least one product from the list of recommended products based on the determination that the at least one product is included in both the list of recommended products for the target user and the list of products that are associated with the users in the target user's social group to form a uniqueness-aware list of recommended products, and presenting the uniqueness-aware list of recommended products to the target user via a graphical user interface on a display of a computing device associated with the target user.

In aspects of the present disclosure, apparatus, systems, and computer program products in accordance with the above aspect may also be provided. Any of the above aspects may be combined without departing from the scope of the present disclosure.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

The goal of a product recommendation system is to present products to a target user that appeal to the target user. For example, product recommendation systems may attempt to recommend a product base on styles, brands, or other features of products that the product recommendation system determines will appeal to the target user's sense of style. For example, the product recommendation system may make a determination of whether a product will appeal to a target user based on data about the target user. In some aspects, for example, the target user's sense of style may be determined based on the target user's purchasing habits, images posted to social media, the target user's web browsing habits (e.g., which products the target user looks at on the web and how long the target user looks at each product), or any other data that may be used to determine a target user's preferences, styles, or other information that may be used to select products for recommendation to the target user.

In some aspects, recommending products to a target user based on style, brands, or other similar information may not be enough to capture the target user's purchases. For example, while the target user may have a certain style, the target user may also wish to be unique. Uniqueness may be determined, for example, by comparing the available products of the target user's style to products owned or in use by users in the target user's social group. For example, the target user may wish to purchase products, e.g., clothing, bags, or other accessories, that are unique within the target user's social group. The social group may include, for example, friends on social media, neighbors, co-workers, family, or any other social group. In some aspects, for example, the social group may be a group of friends on social media that are directly or actively involved with the target user, e.g., those friends that are often tagged in images that also tag the target user, friends who message the target user, friends who post on the target user's wall, or other similar activities.

Figure 1:
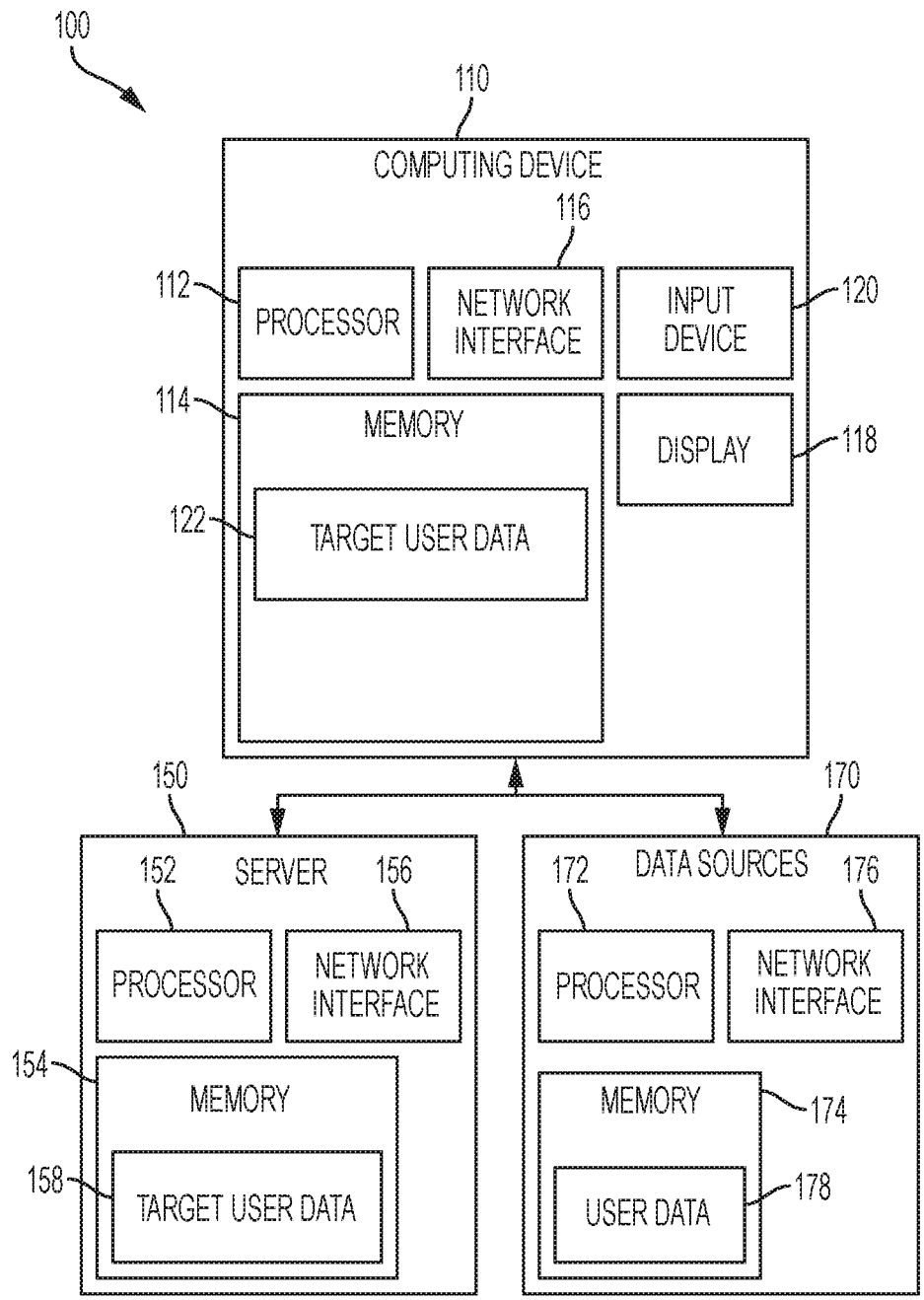
FIG. 1 is a system diagram in accordance with an aspect of the present disclosure.

With reference now to FIG. 1, a system 100 for recommending products to a target user based on the target user's style and on uniqueness from the target user's social group is illustrated. In some aspects, system 100 includes a computing device 110, a server 150, and data sources 170.

Computing device 110 includes at least one processor 112, memory 114, at least one network interface 116, a display 118, an input device 120, and may include any other features commonly found in a computing device. In some aspects, computing device 110 may, for example, be a computing device associated with a target user that is configured to present the target user with a list of recommended products for purchasing by the target user. In some aspects, computing device 110 may include, for example, a personal computer, laptop, tablet, smart device, smart phone, smart watch, or any other similar computing device that may be used by a target user.

Processor 112 may include, for example, a microcontroller, Field Programmable Gate Array (FPGAs), or any other processor that is configured to perform various operations. Processor 112 may be configured to execute instructions as described below. These instructions may be stored, for example, in memory 114.

Memory 114 may include, for example, non-transitory computer readable media in the form of volatile memory, such as random access memory (RAM) and/or cache memory or others. Memory 114 may include, for example, other removable/non-removable, volatile/non-volatile storage media. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 116 is configured to transmit and receive data or information to and from server 150, data sources 170, or any other computing device via wired or wireless connections. For example, network interface 116 may utilize wireless technologies and communication protocols such as Bluetooth®, WWI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit or receive information to or from server 150 or data sources 170.

Display 118 may include any display device that is configured to display information to a target user using computing device 110. For example, in some aspects, display 118 may include a computer monitor, television, smart television, or other similar displays. In some aspects, display 118 may be integrated into or associated with computing device 110, for example, as a display of a laptop, smart phone, smart watch, or other smart wearable devices, as a virtual reality headset associated with computing device 110, or any other mechanism for displaying information to a target user. In some aspects, display 118 may include, for example, a liquid crystal display (LCD), an e-paper/e-ink display, an organic LED (OLED) display, or other similar display technologies. In some aspects, display 118 may be touch-sensitive and may also function as an input device 120.

Input device 120 may include, for example, a keyboard, a mouse, a touch-sensitive display 118, a keypad, a microphone, or other similar input devices or any other input devices that may be used alone or together to provide a target user with the capability to interact with computing device 110.

Server 150 includes a processor 152, memory 154, and a network interface 156 that may include similar functionality as processor 112, memory 114, and network interface 116. In some aspects, server 150 may, for example, be any computing device, server, or similar system that is configured to interact with or provide data to computing device 110. For example, server 150 may be configured to gather and analyze data associated with a target user, e.g., from data sources 170 or computing device 110, and to generate a list of recommended products for purchase by the target user.

In some aspects, each data source 170 may include at least one processor 172, memory 174, and a network interface 176 that may include similar functionality as processor 112, memory 114, and network interface 116. Data sources 170 may store or contain user data 178 that may be analyzed and used to present the target user with recommended products for purchase by the target user.

Data sources 170 may, for example, include any database, web site, social media site, social media application, or any other source of information or data about the target user using computing device 110 such as, for example, the target user's spending habits, the target user's purchases, the target user's hobbies, the target user's interests, the target user's browsing history, or any other information or data about the target user that may be analyzed and used to identify products for recommendation to the target user.

In some aspects, data sources 170 may also or alternatively include any sources of information or data about other users that may be compared to the target user using computing device 110 or server 150. For example, data about other users purchasing patterns, hobbies, interests, or other similar features may be compared to the data about the target user to determine similarities and generate product recommendations based on the similarities. For example, where the target user and another user or group of users have similar purchasing habits, products purchased by that group of users that have not yet been purchased by the target user may be recommended for purchasing by the target user.

In some aspects, data sources 170 may also or alternatively be any sources of information or data about any users that may be part of the target user's social group, e.g., friends, frequent contacts, or other similar users. In some aspects, for example, data sources 170 may include social media sites, retailer web sites, databases or other data sources containing the purchasing history of users including, for example, on-line and in-store purchases. In some aspects, data sources 170 may include databases or data sources containing information about the target user's interests or hobbies (for example, based on web browser usage, web sites visited, purchases, interactions between the user and the web sites, etc.). In some aspects, data sources 170 may include databases or data sources containing target user's communications such as e-mail, social media messaging, blogging, or other similar communications. Data sources 170 may also or alternatively include any other data sources that may provide information about the target user that may be used to recommend products for purchase by the target user.

Figure 2:
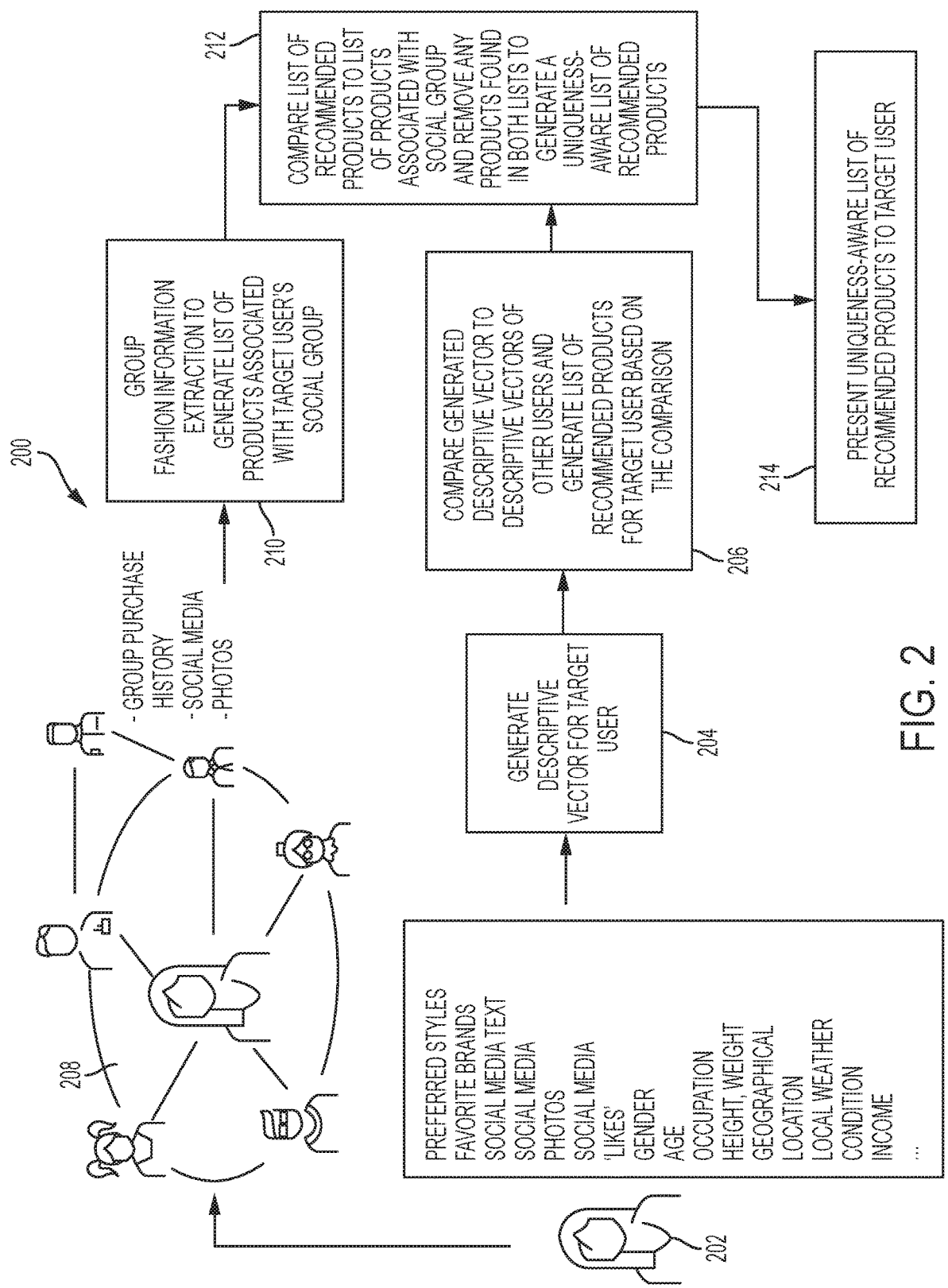
FIG. 2 is a flow chart of a method implemented by the system of FIG. 1 in accordance with an aspect of the present disclosure.

In some aspects, with reference now to FIG. 2, a method 200 for recommending products to a target user that match the target user's style and are unique is illustrated.

At 202, server 150 may access data sources 170 to gather data about the target user. For example, a message may be transmitted to data sources 170 via network interfaces 156 and 176 requesting data about the target user. In some aspects, server 150 may visit a web page, social media site, or other similar data source 170 associated with the target user to gather data about the target user. In some aspects, an application residing on computing device 110 that contains data about the target user may be accessed by server 150. In some aspects, server 150 may access a database or other data repository associated with an application residing on computing device 110 that contains data about the target user. For example, an application for a retailer or a database associated with such an application may be accessed to gather purchasing data, profile data, web surfing data, browsing data, or any other data about the target user that may be used to recommend products to the target user.

In some aspects, data sources 170 may be accessed to gather data about the target user including, for example, preferred styles, favorite brands, social media texts, social media photos, social media "likes", attributes of the user, geographical location of the user, local weather conditions, hobbies, interests, or any other data about the target user that may be used to recommend products to the target user.

In some aspects, questions may be presented by computing device 110 to the target user, for example, regarding the target user's interests, hobbies, or any other information about the target user that may be used to make a recommendation. Any responses by the target user may be added to the data gathered about the target user from data sources 170. The questions may be presented and responses may be received, for example, via an application running on computing device 110, on web page accessed by the user, or other similar methods of presentation and reception.

In some aspects, computing device 110 may present the target user with images including products having different styles. The target user may indicate whether each image includes a product that matches the target user's style. This information may be added to the data gathered about the target user from data sources 170.

In some aspects, for example, any other user input may be received by computing device 110 from the target user regarding the target user's preferences and may be added to the data gathered about the target user from data sources 170.

In some aspects, the accessed data about the target user may be received by server 150 or computing device 110 from data sources 170, for example, via network interfaces 116, 156, and 176. In some aspects, server 150 may store the received data in memory 154 as target user data 158. Although described with reference to server 150, it is contemplated that computing device 110 may also or alternatively access data sources 170 directly to gather data about the target user. In some aspects, for example, computing device 110 receives the data from data sources 170 and may store the received data in memory 114 as target user data 122. In some aspects, for example, server 150 may parse through the users' social media likes, photos, or other information received from data sources 170 to infer the user's fashion preference. In some aspects, server 150 may determine the user's location, e.g., using a global positioning system (GPS) on computing device 110 or geolocation tags on the user's social media content.

At 204, a descriptive vector is generated by computing device 110 or server 150 based on the target user data 122 or 158. For example, the descriptive vector may be a vector of data that records some or all of the information needed to make a decision on the target user's fashion preferences. In some aspects, for example, the descriptive vector may be generated at least in part by processing the target user's interactions on social media including, for example, texting, photos, "likes" or any other interaction. In some aspects, the descriptive vector may also be generated based at least in part on non-fashion information including, for example, geographical location, local weather conditions, or other similar information. In some aspects, the descriptive vector may be generated based at least in part on, for example, fashion styles or products previously purchased by the target user. In some aspects, the descriptive vector may be generated based at least in part on, for example, an analysis of the target user's social media content including image processing of images posted by the target user that may include products that the target user is currently wearing or has historically worn.

In some aspects, for example, the descriptive vector may include one or more numbers indicating physical attributes of the target user. In some aspects, for example, the descriptive vector may include a number or value corresponding to one or more of preferred styles of the target user, favorite brands of the target user, social media text associated with the target user, social media photos associated with the target user, social media 'likes' associated with the target user, an occupation of the target user, a geographical location of the target user, local weather condition where the target consumer is located, socioeconomic status, or other similar measures that may be used to determine what products to recommend to the target user.

In some aspects, for example, each different type of information may require a different process of generating the descriptive vector values. For example, some information may be represented in the descriptive vector by just a single value. For example, gender may be represented as a binary number, e.g., 1 for woman, 0 for man, age may be represented as an integer, etc. Some information may be represented in the descriptive vector by multiple values. For example, weather may include separate values for temperature, wind speed, humidity, etc. In some aspects, some information may require hundreds or thousands of values. For example, a brand preference may be represented by a list or array of 1s and 0s to represent the like/dislike of each brand, visual features of social media photos may be represented by a number of values indicating the presence of common visual features such as SIFT features, or Deep Features, or other similar information.

In some aspects, for example, the descriptive vector may include data points in a high-dimensional space. For example, if a descriptive vector includes 4000 numbers, each referring to an aspect of the target consumer, the target user's descriptive vector may be considered to be the equivalent to a single point in a 4000 dimensional space. To compare one user's vector to other user's vectors, distances in the feature space may be measured (e.g., simple distances like Euclidean distance or complicated distances that requires Distance Metric Learning). For example, the smaller the distance in the 4000 dimensional space between two users descriptive vectors, the more similar the descriptive vectors of those users are.

In some aspects, for example, the descriptive vector values may be normalized across datasets, for example using sigmoid normalization. For example, groups of descriptive vector values may be weighted according to the number of elements in their group. For example, if the brand preference values of the descriptive vectors require 1000 dimensional elements, the brand preference may be weighted by 1/1000 so that they carry a similar "importance" as elements that have a larger or smaller number of dimensional elements.

At 206, the descriptive vector of the target user may be compared to descriptive vectors of other users or groups of users by computing device 110 or server 150 to determine a similarity between the descriptive vectors. For example, in some aspects, rules may be manually defined that measure the similarity between two vectors. In some aspects, for example, a machine learning model may be trained to determine the similarity using a set of training data including a plurality of vectors and an identification of the similarity between each pair of vectors in the set of training data. For example, the machine learning module may be trained to output a similarity score, e.g., a value between 0% and 100%, which identifies the similarity between two descriptive vectors. In some aspects, a hybrid approach may be used to determine similarity including manually defined rules that may be utilized by the machine learning model to determine a similarity.

In some aspects, for example, the similarity determination may be based on a Euclidean distance between the two descriptive vectors.

In some aspects, the output of the similarity determination may be compared to a predetermined threshold similarity value to determine whether the descriptive vector for the target user and the descriptive vector of another user are similar enough. For example, if the predetermined threshold similarity value is 75% and the determined similarity is 65%, the computing device 110 or server 150 may determine that the descriptive vectors are not similar enough to warrant the generation of a list of products based on the descriptive vectors of the other user for the target user. In some aspects, the predetermined threshold similarity value may be pre-determined for each version of the application. In some aspects, the pre-determined threshold may be determined based on user input, user feedback, a user study, or in any other manner. For example, users may be asked to provide feedback on the provided product recommendations and that feedback may be utilized to generate or tune the pre-determined similarity threshold.

If the determined similarity is above the predetermined threshold similarity value, e.g., 80%, a list of recommended products is generated by computing device 110 or server 150 based on the comparison. In some aspects, for example, descriptive vectors with a high similarity to the descriptive vector of the target user may be used as a basis for generating a list of recommending products for the target user.

In some aspects, for example, a recommendation function may be trained to map descriptive vectors to distributions of desired fashion attributes. In some aspects, for example, the recommendation function may be trained based on input feature vectors such as the descriptive vector or data used to generate the descriptive vector and expected outputs such as probability scores for a list of pre-defined fashion attributes, e.g., category (dress, shoes, gloves, etc.), color, cut, size, patterns (solid, stripes, graphics, etc.), fabric (denim, silk, velvet, cotton, polyester, etc.) or other similar fashion attributes.

In some aspects, for example, a training set of data may be collected including a large number of users and their corresponding descriptive vectors and purchase history data. Fashion attributes may be extracted from each product in the purchase histories and the recommendation function may be trained based on the descriptive vectors and the corresponding output fashion attributes. For example, in some aspects, a machine learning model such as a neural network may be trained using the descriptive vectors as inputs and the fashion attributes as expected outputs. In some aspects, deep learning machine learning models may be used.

In some aspects, a portion of the training set of data may be used to train the machine learning model while a second portion of the training set of data may be set apart for use in testing the model. In some aspects, the model may be tested using descriptive vectors and other data from real users, e.g., by performing a study and requesting feedback on the product recommendation results from the users.

In some aspects, for example, the descriptive vector for the target user may be input into the trained recommendation function and the recommendation function may output probability scores for each pre-defined fashion attribute that may be used to generate the list of recommended products. For example, products may be selected for inclusion in the list of recommended products by determining one or more corresponding fashion attributes from the list of pre-defined fashion attributes for each product. The probability scores output by the recommendation function for the corresponding list of pre-determined fashion attributes may then be utilized to determine whether the products should be included in the list of recommended products.

In some aspects, products purchased or worn by the users other than the target user, e.g., users determined to have similar descriptive vectors to the target user, may be analyzed to determine whether they should be included in the list of recommended products. For example, corresponding pre-determined fashion attributes for each product may be determined, and the product may be added to the list of recommended products based on the probability scores for the corresponding pre-determined fashion attributes generated by the recommendation function for the target user.

In some aspects, for example, only products having corresponding pre-determined fashion attributes with probability scores that are higher than a pre-determined threshold score may be included in the list of recommended products. For example, if a particular hat has a red color and striped pattern, the system may determine which pre-determined fashion attributes correspond to the hat, e.g., type: hat, color: red, pattern: striped. The corresponding pre-determined fashion attributes may then be used to determine the probability scores for each fashion attribute of the hat and the probability scores may be used to determine whether to include the hat in the list of recommended products. For example, the recommendation function may determine based on the target user's descriptive vector that hats have a probability score of 60%, the color red has a probability score of 75%, and the striped pattern has a probability score of 30%. If the predetermined threshold for including an item in the list of recommended items is 70%, the particular hat may be included by virtue of the color red scoring 75% for the target user. In some aspects, for example, more than one fashion attribute may be required to be above the pre-determined threshold. For example, if the color red is above the threshold of 70% but no other fashion attribute is above the threshold, the particular hat may not be included in the list of recommended products for the target user.

In some aspects, for example, the fashion attributes of each product may be pre-computed, e.g., each product may have its fashion attributes computed once at the time that it is added to the inventory. In some aspects, for example, the fashion attributes may be identified based on web page data for sale of the product. For example, a product may have a set of fashion attributes on the web page, e.g., product type, color, brand, price, size, collection, etc. In some aspects, for example, a pre-trained classifier may be used that applies computer vision technology to assess the fashion attributes of a product. For example, an image of the product may be analyzed to determine the fashion attributes of a product using computer vision technology.

In some aspects, for example, the descriptive vector of the target user may be mapped to a list of product attributes with scores using the recommendation function as described above and then the scores may be compared to the fashion attributes of the products to determine products having similar fashion attributes, e.g., by determining a Euclidean distance between two attributes.

At 208, the data sources 170 may be accessed and analyzed, for example, by computing device 110 or server 150, to determine the target user's contacts, friends, associates, social circle, colleagues, or other similar users that may be part of the target user's social group. For example, computing device 110 or server 150 may access and analyze the target user's social media, communications, business directories, or any other data source 170 to determine the target user's social group. For example, the target user's social media profile may be accessed and analyzed to determine who the user is friends with, who the user communicates with, whose posts the user "likes", who "likes" the user's posts, or other similar connections that may be used to determine a list of users who are in the target user's social group. The computing device 110 or server 150 may also access and analyze data sources 170 associated with the target user's social group list to determine purchasing history, social media usage, photos, or other similar data about the users in the target user's social group list.

At 210, group fashion information may be extracted from the data associated with the target user's social group list. For example, computing device 110 or server 150 may determine based on data received from data sources 170 a list of products that users in the target user's social group list have purchased. In some aspects, for example, computing device 110 or server 150 may perform image processing on photos or images posted to social media by the users in the target user's social group list to determine a list of products or fashions that the users in the target user's social group list are wearing. In some aspects, computing device 110 or server 150 may also analyze any other data received from data sources 170 about the users in the target user's social group list to determine a list of products that the users in the target user's social group list own, have worn, or are currently wearing. In some aspects, these lists may be combined into a list of products associated with the users in the target user's social group list.

At 212, the list of recommended products for the target user generated at 206 is compared to the combined list of products associated with the users in the target user's social group list. In some aspects, any products found in both the combined list of products associated with the users in the target user's social group list and list of recommended products for the target user may be removed from the list of recommended products to generate a uniqueness-aware list of recommended products for the target user.

At 214, the uniqueness-aware list of recommended products is presented to the target user, for example, via display 118 (FIG. 1).

Figure 3:
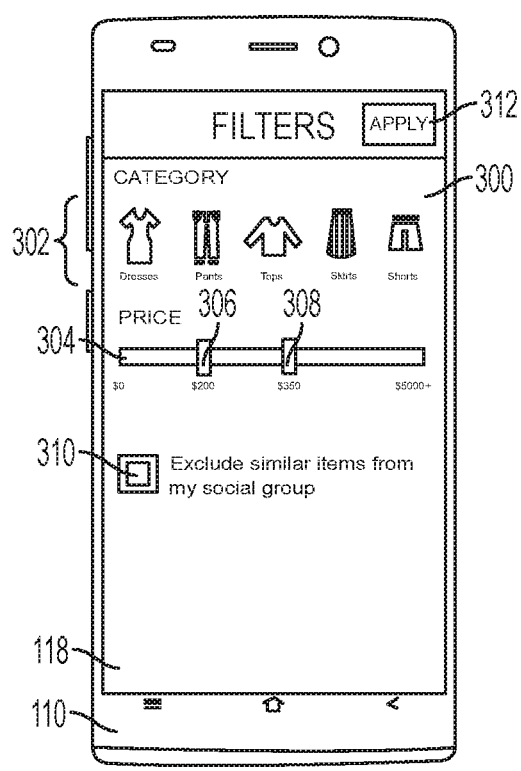
FIGS. 3-6 are illustrations of example graphical user interfaces implemented by the system of FIG. 1 in accordance with an aspect of the present disclosure.

With reference now to FIG. 3, an example computing device 110 presenting a graphical user interface (GUI) 300 on an example display 118 is illustrated. Interface 300 may be used to present the uniqueness-aware list of recommended products to the user.

In some aspects, interface 300 may include elements 302 that may be activated by the target user to select a category of products, for example, dresses, pants, tops, skirts, shorts, etc. For example, the target user may use input device 120 (FIG. 1) of computing device 110 to activate any of elements 302.

In some aspects, interface 300 may include an element 304 activatable by the target user to set a price range for products to be presented to the target user via interface 300. For example, in some aspects, element 304 may include one or more slidable tabs 306, 308 that may be used by the target user to set a price range. For example, tab 306 may be activatable and slidable to set a minimum price while tab 308 may be activatable and slidable to set a maximum price.

For example, the target user may use input device 120 (FIG. 1) of computing device 110 to activate any of elements 304, 306, and 308.

In some aspects, interface 300 may include an element 310 that is activatable by the target user to exclude the display of similar items from the target user's social group. For example, the target user may use input device 120 (FIG. 1) of computing device 110 to activate element 310. In FIG. 3, element 310 is illustrated as not activated, for example, as shown by an empty box.

In some aspects, interface 300 may include an element 312 that is activatable by the target user to apply the selections activated in elements 302, 304, 306, 308, 310. For example, the target user may use input device 120 (FIG. 1) of computing device 110 to activate element 312. Activation of element 312 with element 310 not activated may cause computing device 110 to present a list of products to the target user, for example, as illustrated in FIG. 4.

Figure 4:
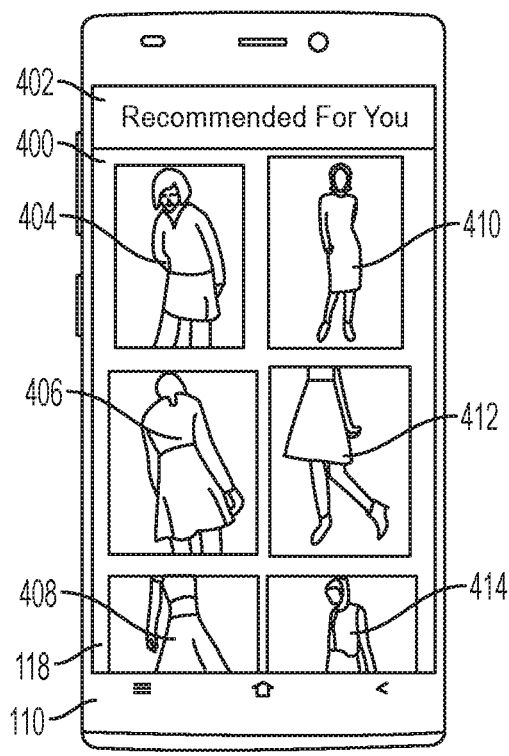

With reference now to FIG. 4, for example, when element 310 is not activated, e.g., similar items are not excluded, a graphical user interface 400 may be presented to the target user on display 118 of computing device 110 in response to the activation of element 312 including a list of products 402. List of products 402 includes, for example, products 404, 406, 408, 410, 412, and 414. In some aspects, the presented list of products 402 may include additional products (not shown). For example, the user may use input device 120 to activate, drag, or otherwise manipulate interface 400 to scroll through the list of recommended products. The products presented in the list of products 402 may, for example, correspond to list of recommended products generated at 206 (FIG. 2) as described above.

Figure 5:
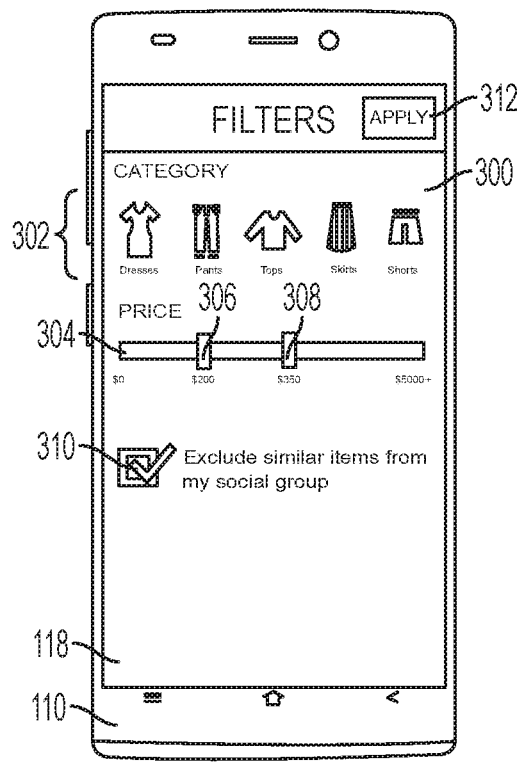

With reference now to FIG. 5, for example, interface 300 is illustrated with element 310 activated, for example, showing a check mark in the box. Activation of element 312 with element 310 activated may cause computing device 110 to present a list of products to the target user, for example, as illustrated in FIG. 6.

Figure 6:
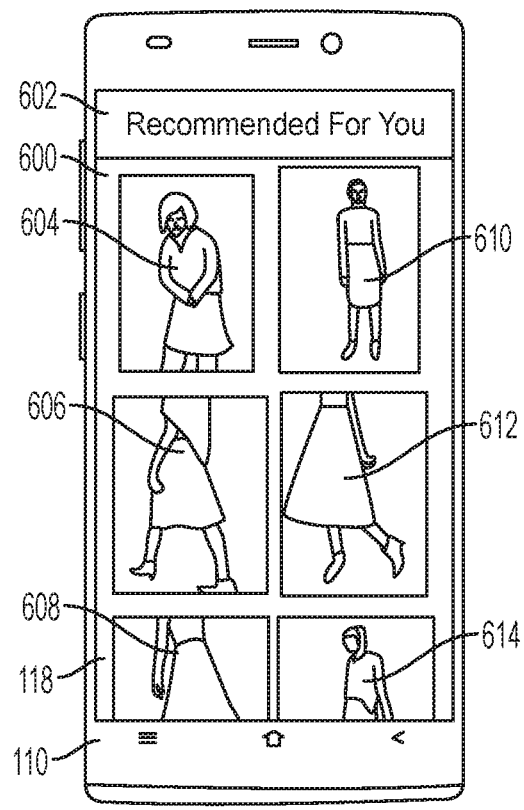

With reference now to FIG. 6, for example, when element 310 is activated, e.g., similar items are excluded, a graphical user interface 600 may be presented to the target user on display 118 of computing device 110 in response to the activation of element 312 including a list of products 602. List of products 602 includes, for example, products 604, 606, 608, 610, 612, and 614. In some aspects, the presented list of products 602 may include additional products (not shown). For example, the user may use input device 120 to activate, drag, or otherwise manipulate interface 600 to scroll through the list of products 602. The products presented in the list of products 602 may, for example, correspond to uniqueness-aware list of recommended products generated at 212 (FIG. 2) as described above.

As shown in FIGS. 4 and 6, for example, the list of products presented to the target user differ based on whether element 310 (FIG. 3) of user interface 300 (FIG. 3) is activated. For example, while products 404, 408, 412, and 414 are the same as products 604, 608, 612, and 616, products 406 and 410 differ from products 606 and 610. This is because products 406 and 410 are products associated with the users in the target user's social group list. When element 310 is activated, products 406 and 410 are removed from the list of recommended products, as described above at 212 (FIG. 2) and 214 (FIG. 2), to generate the uniqueness-aware list of recommended products for presentation as list of products 602. As illustrated in FIG. 6, list of products 602 presents products 606 and 610 that are different than products 406 and 410. In this manner, the target user may be presented with products that both meet their sense of style, e.g., by generating a list of products based on the descriptive vector of the target user, while maintaining a uniqueness for the target user by remove those products associated with the target user's social group.

Figure 7:
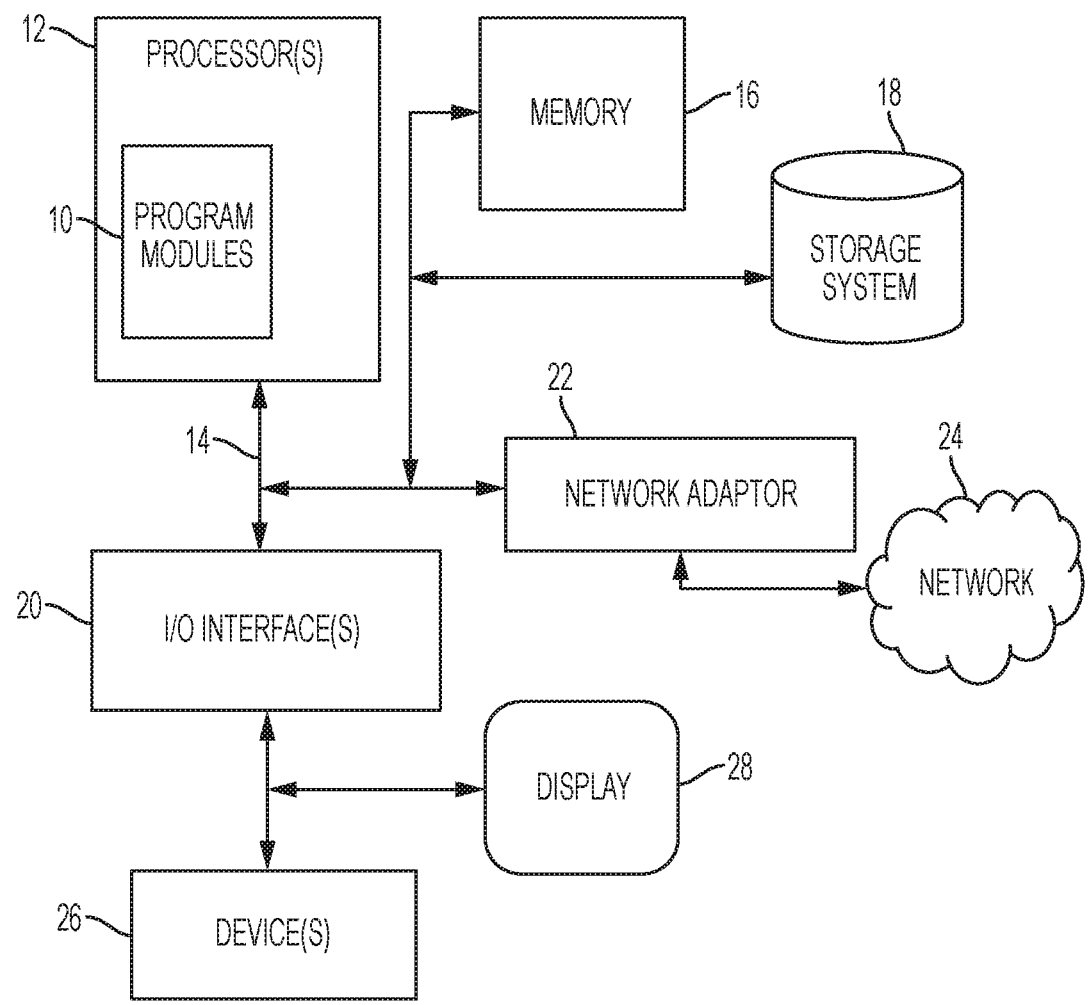
FIG. 7 is an exemplary block diagram of a computer system in which processes involved in the system, method, and computer program product described herein may be implemented.

FIG. 7 illustrates a schematic of an example computer or processing system that may implement any portion of system 100, computing device 110, server 150, data sources 170, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor comprising:
   receiving data associated with a target user;
   generating a descriptive vector for the target user based on the received data, the generating of the descriptive vector including at least image processing of images posted by the target user and extracting visual features of the images, the descriptive vector generated to include at least the extracted visual features;
   executing a machine learned recommendation function with the descriptive vector to generate a score for each of a plurality of pre-defined fashion attributes;
   comparing the descriptive vector of the target user to a descriptive vector of at least one other user, the comparing including at least training a machine learning model using a set of training data including a plurality of descriptive vectors and an identification of similarity between each pair of descriptive vectors in the set of training data, to determine a similarity value, and running the trained machine learning model;
   determining, based on the comparison, that a similarity between the descriptive vector of the target user and the descriptive vector of the at least one other user is above a pre-determined threshold;
   in response to determining that the similarity is above the pre-determined threshold, generating a list of products that are associated with the at least one other user;
   determining for each product in the list of products, at least one of the pre-defined fashion attributes as a fashion attribute of the product;
   generating a list of recommended products for the target user from the list of products based on the generated score of each of the pre-defined fashion attributes that are determined to be fashion attributes of the products in the list of products;

determining, based on the data associated with the target user, users that are in the target user's social group;

determining a list of products that are associated with the users in the target user's social group;

comparing the list of recommended products for the target user to the list of products that are associated with the users in the target user's social group;

determining, based on the comparison, that at least one product is included in both the list of recommended products for the target user and the list of products that are associated with the users in the target user's social group;

removing the at least one product from the list of recommended products based on the determination that the at least one product is included in both the list of recommended products for the target user and the list of products that are associated with the users in the target user's social group to form a uniqueness-aware list of recommended products; and presenting the uniqueness-aware list of recommended products to the target user via a graphical user interface on a display of a computing device associated with the target user.

2. The method of claim 1, wherein the data associated with the target user comprises at least one of preferred styles of the target user, favorite brands of the target user, social media texts of the target user, social media photos of the target user, social media "likes" of the target user, a demographic of the target user, a physical attribute of the target user, a geographical location of the target user, and a local weather condition.

3. The method of claim 1, further comprising:
presenting at least one question to the target user via the graphic user interface; and
receiving from the target user at least one answer in response to the at least one question,
wherein the descriptive vector is generated based at least in part on the received answer.

4. The method of claim 1, further comprising:
presenting at least one image including at least one product to the target user; and
receiving from the target user a score for the at least one product in the at least one image,
wherein the descriptive vector is generated based at least in part on the received score for the at least one product in the at least one image.

5. The method of claim 1, further comprising:
presenting a uniqueness element to the target user via the graphical user interface, the uniqueness element selectively activatable by the target user between at least a first state and a second state, wherein:
when the uniqueness element is in the first state, the at least one processor presents the uniqueness-aware list of recommended products to the target user via the graphical user interface; and
when the uniqueness element is in the second state, the at least one processor presents the list of recommended products to the target user via the graphical user interface instead of the uniqueness-aware list of recommended products.

6. The method of claim 1, wherein generating the list of products that are associated with the at least one other user in response to determining that the similarity is above the pre-determined threshold comprises:

receiving data associated with the at least one other user, the data comprising product purchases made by the at least one other user; and
generating the list of products that are associated with the at least one other user based on the product purchases made by the at least one other user.

7. The method of claim 1, further comprising training the machine learned recommendation function using machine learning techniques based on descriptive vectors of a plurality of users.

8. A system comprising:
a display; and
at least one hardware processor coupled to the display and configured to:
receive data associated with a target user;
generate a descriptive vector for the target user based on the received data, by at least performing image processing of images posted by the target user and extracting visual features of the images, the descriptive vector generated to include at least the extracted visual features;
execute a machine learned recommendation function with the descriptive vector to generate a score for each of a plurality of pre-defined fashion attributes;
compare the descriptive vector to a descriptive vector generated for at least one other user, the at least one hardware processor configured to compare by at least training a machine learning model using a set of training data including a plurality of descriptive vectors and an identification of similarity between each pair of descriptive vectors in the set of training data, to determine a similarity value, and running the trained machine learning model;
determine, based on the comparison, that a similarity between the descriptive vector of the target user and the descriptive vector of the at least one other user is above a pre-determined threshold;
in response to determining that the similarity is above the pre-determined threshold, generate a list of products that are associated with the at least one other user;
determine for each product in the list of products, at least one of the pre-defined fashion attributes as a fashion attribute of the product;
generate a list of recommended products for the target user from the list of products based on the generated score of each of the pre-defined fashion attributes that are determined to be fashion attributes of the products in the list of products;
determine, based on the data associated with the target user, users that are in the target user's social group;
determine a list of products that are associated with the users in the target user's social group;
compare the list of recommended products for the target user to the list of products that are associated with the users in the target user's social group;
determine, based on the comparison, that at least one product is included in both the list of recommended products for the target user and the list of products that are associated with the users in the target user's social group;
remove the at least one product from the list of recommended products based on the determination that the at least one product is included in both the list of recommended products for the target user and the list of products that are associated with the users in the target user's social group to form a uniqueness-aware list of recommended products; and
present the uniqueness-aware list of recommended products to the target user via a graphical user interface on the display.

9. The system of claim 8, wherein the data associated with the target user comprises at least one of preferred styles of the target user, favorite brands of the target user, social media texts of the target user, social media photos of the target user, social media "likes" of the target user, a demographic of the target user, a physical attribute of the target user, a geographical location of the target user, and a local weather condition.

10. The system of claim 8, the at least one hardware processor further configured to:
present at least one question to the target user via the graphic user interface; and
receive from the target user at least one answer in response to the at least one question,
wherein the descriptive vector is generated based at least in part on the received answer.

11. The system of claim 8, the at least one hardware processor further configured to:
present at least one image including at least one product to the target user; and
receive from the target user a score for the at least one product in the at least one image,
wherein the descriptive vector is generated based at least in part on the received score for the at least one product in the at least one image.

12. The system of claim 8, the at least one hardware processor further configured to:
present a uniqueness element to the target user via the graphical user interface, the uniqueness element selectively activatable by the target user between at least a first state and a second state, wherein:
when the uniqueness element is in the first state, the at least one processor presents the uniqueness-aware list of recommended products to the target user via the graphical user interface; and
when the uniqueness element is in the second state, the at least one processor presents the list of recommended products to the target user via the graphical user interface instead of the uniqueness-aware list of recommended products.

13. The system of claim 8, wherein generating the list of products that are associated with the at least one other user in response to determining that the similarity is above the pre-determined threshold comprises:
receiving data associated with the at least one other user, the data comprising product purchases made by the at least one other user; and
generating the list of products that are associated with the at least one other user based on the product purchases made by the at least one other user.

14. The system of claim 8, the at least one hardware processor further configured to:
train the machine learned recommendation function using machine learning techniques based on descriptive vectors of a plurality of users.

15. A computer program product comprising a non-transitory computer readable storage medium having program instructions embodied therewith, the program instructions executable by a device to cause the device to:
receive data associated with a target user;
generate a descriptive vector for the target user based on the received data, by at least performing image processing of images posted by the target user and extracting visual features of the images, the descriptive vector generated to include at least the extracted visual features;
execute a machine learned recommendation function with the descriptive vector to generate a score for each of a plurality of pre-defined fashion attributes;
compare the descriptive vector to a descriptive vector generated for at least one other user, the device caused to compare by at least training a machine learning model using a set of training data including a plurality of descriptive vectors and an identification of similarity between each pair of descriptive vectors in the set of training data, to determine a similarity value, and running the trained machine learning model;
determine, based on the comparison, that a similarity between the descriptive vector of the target user and the descriptive vector of the at least one other user is above a pre-determined threshold;
in response to determining that the similarity is above the pre-determined threshold, generate a list of products that are associated with the at least one other user;
determine for each product in the list of products, at least one of the pre-defined fashion attributes as a fashion attribute of the product;
generate a list of recommended products for the target user from the list of products based on the generated score of each of the pre-defined fashion attributes that are determined to be fashion attributes of the products in the list of products;
determine, based on the data associated with the target user, users that are in the target user's social group;
determine a list of products that are associated with the users in the target user's
compare the list of recommended products for the target user to the list of products that are associated with the users in the target user's social group;
determine, based on the comparison, that at least one product is included in both the list of recommended products for the target user and the list of products that are associated with the users in the target user's social group;
remove the at least one product from the list of recommended products based on the determination that the at least one product is included in both the list of recommended products for the target user and the list of products that are associated with the users in the target user's social group to form a uniqueness-aware list of recommended products; and
present the uniqueness-aware list of recommended products to the target user via a graphical user interface on the display.

16. The computer program product of claim 15, wherein the data associated with the target user comprises at least one of preferred styles of the target user, favorite brands of the target user, social media texts of the target user, social media photos of the target user, social media "likes" of the target user, a demographic of the target user, a physical attribute of the target user, a geographical location of the target user, and a local weather condition.

17. The computer program product of claim 15, the instructions further configuring the at least one hardware processor to:
present at least one question to the target user via the graphic user interface; and
receive from the target user at least one answer in response to the at least one question, wherein the descriptive vector is generated based at least in part on the received answer.

18. The computer program product of claim 15, the instructions further configuring the at least one hardware processor to:
presenting at least one image including at least one product to the target user; and
receiving from the target user a score for the at least one product in the at least one image,
wherein the descriptive vector is generated based at least in part on the received score for the at least one product in the at least one image.

19. The computer program product of claim 15, the instructions further configuring the at least one hardware processor to:
presenting a uniqueness element to the target user via the graphical user interface, the uniqueness element selectively activatable by the target user between at least a first state and a second state, wherein:
when the uniqueness element is in the first state, the at least one processor presents the uniqueness-aware list of recommended products to the target user via the graphical user interface; and
when the uniqueness element is in the second state, the at least one processor presents the list of recommended products to the target user via the graphical user interface instead of the uniqueness-aware list of recommended products.

20. The computer program product of claim 15, wherein generating the list of products that are associated with the at least one other user in response to determining that the similarity is above the pre-determined threshold comprises:
receiving data associated with the at least one other user, the data comprising product purchases made by the at least one other user; and
generating the list of products that are associated with the at least one other user based on the product purchases made by the at least one other user.

* * * * *